(12) United States Patent
Wushour

(10) Patent No.: US 11,893,285 B2
(45) Date of Patent: Feb. 6, 2024

(54) SYSTEM AND METHOD FOR IMPROVED COLOR CALIBRATION

(71) Applicant: KYOCERA Document Solutions, Inc., Osaka (JP)

(72) Inventor: Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 21 days.

(21) Appl. No.: 17/729,467

(22) Filed: Apr. 26, 2022

(65) Prior Publication Data

US 2023/0342091 A1 Oct. 26, 2023

(51) Int. Cl.
| | |
|---|---|
| G06F 3/12 | (2006.01) |
| G01K 13/00 | (2021.01) |
| H04N 1/60 | (2006.01) |
| G01N 21/31 | (2006.01) |

(52) U.S. Cl.
CPC ............ G06F 3/1208 (2013.01); G01K 13/00 (2013.01); G01N 21/31 (2013.01); G06F 3/1224 (2013.01); G06F 3/1288 (2013.01); H04N 1/6091 (2013.01); G06F 3/1204 (2013.01)

(58) Field of Classification Search
CPC .... G06F 3/1208; G06F 3/1224; G06F 3/1288; G01K 13/00; G01N 21/31; H04N 1/6091
USPC .......................................................... 358/1.9
See application file for complete search history.

(56) References Cited

U.S. PATENT DOCUMENTS

| 7,006,690 B1 | 2/2006 | Imura |
| 2005/0141057 A1 | 6/2005 | Kumada et al. |
| 2013/0250322 A1* | 9/2013 | Kawabata ............ H04N 1/6058 358/1.9 |

(Continued)

OTHER PUBLICATIONS

Byjus. Principle of Spectrophotometer and its Applications. https://byjus.com/chemistry/spectrophotometer-principle/ (last accessed Apr. 12, 2022).

(Continued)

*Primary Examiner* — Darryl V Dottin
(74) *Attorney, Agent, or Firm* — GrowIP Law Group LLC

(57) ABSTRACT

A method for color calibration of a print device is provided. The method includes receiving, at the print device, a print job request that includes a color print job, determining, at the print device, print job data including data associated with the color print job and the print device, wherein the data associated with the print device includes an ambient temperature sensed by an embedded temperature sensor in the print device, and transmitting, by the print device, the print job data to a cloud server to request a stored matching color profile having associated data that matches, within a defined threshold, the print job data. Using techniques disclosed herein, printer calibration is automated using big data analytics (i.e., continuous learning, analyzing, and optimizing). A spectrophotometer and temperature sensor are embedded into the print device and a printer bot, as a helper printer-resident application, builds a data module and automates the calibration process; a calibration profile is generated for each print job based on the current printer, paper, ink, and the room temperature. A non-transitory computer-readable medium and print device are also provided.

16 Claims, 7 Drawing Sheets

(56) References Cited

U.S. PATENT DOCUMENTS

2014/0293091 A1* 10/2014 Rhoads ..................... G01J 3/10
  348/234
2015/0352789 A1* 12/2015 Haider ................... B33Y 30/00
  264/129

OTHER PUBLICATIONS

Fritch A. How to calibrate your photo printer? https://www.color-management-guide.com/how-to-calibrate-your-printer Published Apr. 15, 2015 (last accessed Apr. 12, 2022).
Fritch A. How to calibrate a photo printer with spectrophotometer? hhttps://www.color-management-guide.com/how-to-calibrate-printer-with-spectrophotometer-kit.html. Published Apr. 15, 2015 (last accessed Apr. 12, 2022).
Color Management Tutorial, ICC Workflow. https://www.booksmartstudio.com/color_tutorial/iccworkflow.html#:~:te (last accessed Apr. 12, 2022).
Color Management Tutorial, Printer Profiling. https://www.booksmartstudio.com/color_tutorial/printers.html (last accessed Apr. 12, 2022).
Deepak BH. Comparison between Single Beam and Double Beam Atomic Absorption Spectrometer Systems. https://ab-training.com/comparison-between-single-beam-and-double-beam-atomic-absorption-spectrometer-systems/, Published Dec. 28, 2013 (last accessed Apr. 12, 2022).
Mouw T. What is a Colorimeter? Colorimeter vs. Spectrophotometer. https://www.xrite.com/blog/colorimeter-vs-spectrophotometer. Published Oct. 7, 2019 (last accessed Apr. 12, 2022).

* cited by examiner

SYSTEM AND METHOD FOR IMPROVED COLOR CALIBRATION

FIELD

This disclosure relates to the field of color printing, and, in particular, to color calibration, such as in a production printing setting.

BACKGROUND

Individual printing devices, such as Multi-Function Peripherals (MFPs), each have their own unique color signatures, displaying certain colors differently from one another (even for the same device manufacturer and model) according to manufacturing tolerances and material deterioration through use and age. Additional distorting factors include the qualities of a particular batch of paper and ink.

In order to allow for consistent color reproduction in a color-managed workflow, printing devices are typically required to undergo color calibration for high-quality color print environments. The aim of color calibration is to measure and/or adjust the color response of a device (input or output) to a known state. In International Color Consortium (ICC) terms, this is the basis for an additional color characterization of the device and later profiling. The ICC profile for a printer is typically created by comparison of a test print result using a photometer manually with the original reference file. The test print contains known CMYK colors, whose measured offsets to their actual L*a*b* colors scanned by the photometer can be used to create an ICC profile. For high-end applications, a calibration profile is necessary for each printer/paper/ink combination.

The aforementioned process is tedious, repetitive, and manual. In order to get an optimal setting for the highest quality printout, the calibration process is done frequently, which is time consuming and labor intensive.

Needed are an improved system and method for automated color calibration of a printing device.

SUMMARY

One embodiment set forth herein is directed a method for color calibration of a print device, the method comprising (a) receiving, at the print device, a print job request that includes a color print job; (b) determining, at the print device, print job data including data associated with the color print job and the print device, wherein the data associated with the print device includes an ambient temperature sensed by an embedded temperature sensor in the print device; and (c) transmitting, by the print device, the print job data to a cloud server to request a stored matching color profile having associated data that matches, within a defined threshold, the print job data.

A second embodiment set forth herein is directed to a non-transitory computer readable medium for color calibration of a print device, the method comprising: (a) receiving, at the print device, a print job request that includes a color print job; (b) determining, at the print device, print job data including data associated with the color print job and the print device, wherein the data associated with the print device includes an ambient temperature sensed by an embedded temperature sensor in the print device; (c) transmitting, by the print device, the print job data to a cloud server to request a stored matching color profile having associated data that matches, within a defined threshold, the print job data.

A third embodiment set forth herein is directed to a print device having color calibration, comprising an embedded spectrophotometer for measuring color performance of the print device, an embedded temperature sensor for measuring an ambient temperature at the print device, and a controller having a processor to execute instructions stored in a memory, the memory additionally storing a color calibration chart having a plurality of different color patches each having a known color value in an independent color space, the instructions executable by the processor to implement a print bot that performs functions including: (a) determining, at the print device, print job data including data associated with the print device and with a color print job received in a print job request, wherein the data associated with the print device includes an ambient temperature sensed by the embedded temperature sensor in the print device; and (b) transmitting, by the print device, the print job data to a cloud server to request a stored matching color profile having associated data that matches, within a defined threshold, the print job data.

Using techniques disclosed herein, printer calibration is automated using big data analytics (i.e., continuous learning, analyzing, and optimizing). A spectrophotometer and temperature sensor are embedded into the print device in some embodiments. A printer bot, as a helper printer-resident application, builds a data module and automates the calibration process; a calibration profile is generated for each print job based on the current printer, paper, ink, and the room temperature.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The accompanying drawings are included to provide a further understanding of the systems, apparatus, devices, and/or methods of the disclosure, and are incorporated in and constitute a part of this specification. The drawings are not necessarily to scale, and sizes of various elements may be distorted for clarity and/or illustrated as simplistic representations to promote comprehension. The drawings illustrate one or more embodiments of the disclosure, and together with the description, serve to explain the principles and operation of the disclosure.

DETAILED DESCRIPTION

Figure 1:
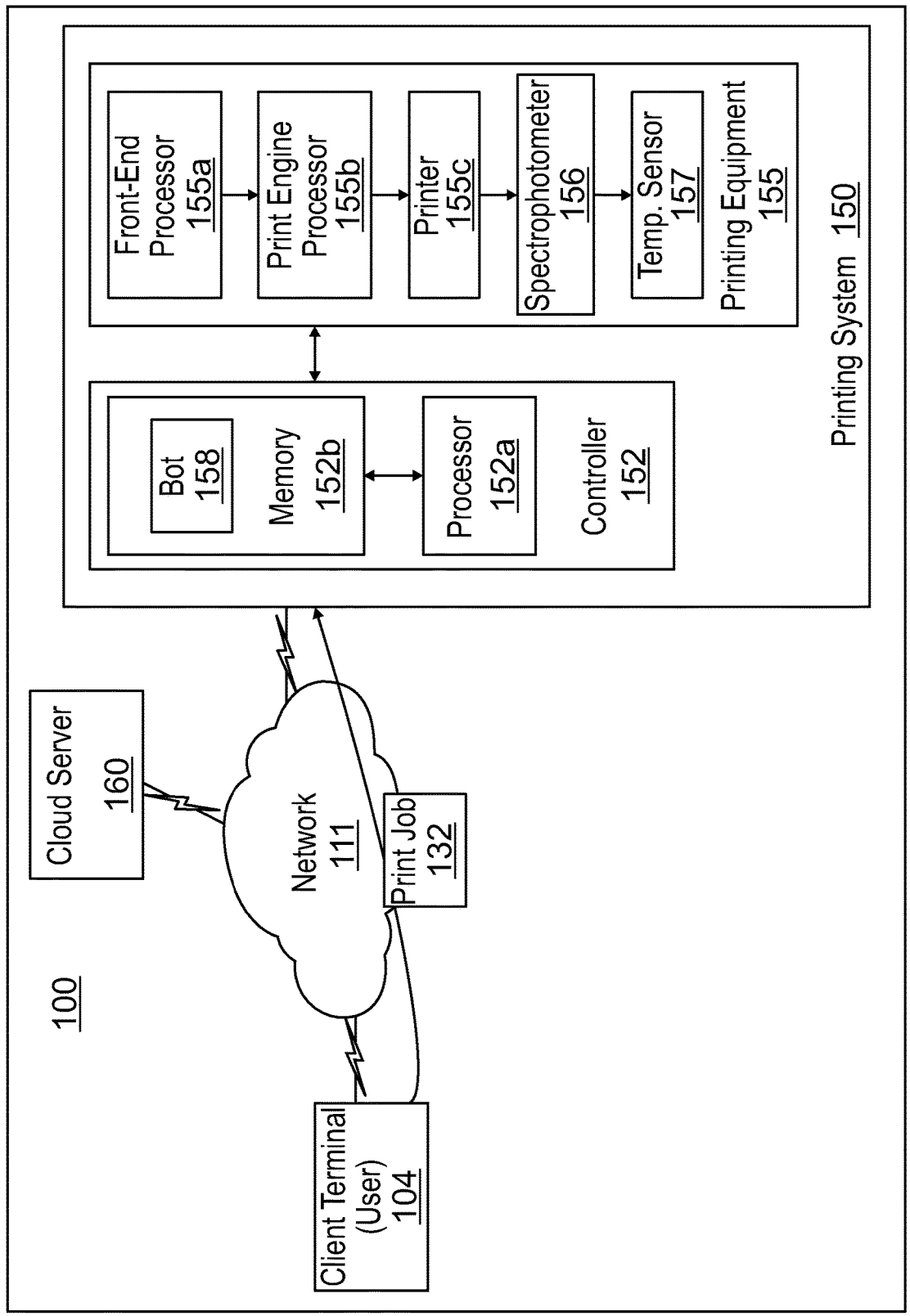
FIG. 1 is a simplified block diagram illustrating an environment that includes various entities that cooperate to facilitate providing improved color calibration, according to an example embodiment.

Example systems, apparatus, devices, and/or methods are described herein. It should be understood that the word "example" is used to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. The aspects described herein are not limited to specific embodiments, apparatus, or configurations, and as such can, of course, vary. It should be readily understood that the aspects of the present disclosure, as generally described herein, and illustrated in the figures, can be arranged, substituted, combined, separated, and designed in a wide variety of different configurations. It is also to be understood that the terminology used herein is for the purpose of describing particular aspects only, and unless specifically defined herein, is not intended to be limiting.

Throughout this specification, unless the context requires otherwise, the words "comprise" and "include" and variations (e.g., "comprises," "comprising," "includes," "including," "has," and "having") will be understood to imply the inclusion of a stated component, feature, element, or step or group of components, features, elements, or steps, but not the exclusion of any other component, feature, element, or step or group of components, features, elements, or steps.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

As used in the specification and the appended claims, the singular forms "a," "an," and "the" include plural referents unless the context clearly dictates otherwise.

Ranges can be expressed herein as from "about" one particular value and/or to "about" another particular value. When such a range is expressed, another aspect includes from the one particular value and/or to the other particular value. Similarly, when values are expressed as approximations by use of the antecedent "about," it will be understood that the particular value forms another aspect. It will be further understood that the endpoints of each of the ranges are significant both in relation to the other endpoint and independently of the other endpoint.

Any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

To assist in providing improved color calibration, the presently described technology includes automation using big data analytics, along with a spectrophotometer that is embedded directly into the printer. Distorting factors, such as paper and ink type, are considered, as is room temperature for a particular printer. A bot helper application residing in the printer builds a data module through continuous learning and prediction. The bot helper application automatically adjusts the color calibration by recommending optimal settings and/or generates a calibration profile for each print job based on the current printer, paper, ink, and the room temperature.

By automating and continuously enhancing through self-learning, the improved color calibration is able to generate high quality (optimized) output for every print job. Color calibration time is reduced, as is waste, making this an environmentally friendly solution. Generated data (i.e., big data) can be gathered and stored in the cloud so that a broad collection of ICC profiles can be shared among customers associated with a plurality of print devices, systems, and/or environments.

Using techniques disclosed herein, printer calibration is automated using big data analytics (i.e., continuous learning, analyzing, and optimizing). A spectrophotometer is embedded into the printer itself, in order to generate the ICC profile on the fly, if needed for a particular print job. In addition to considering paper and ink as distorting factors, ambient (room) temperature is also taken into consideration. A printer bot, as a helper printer-resident application, builds a data module and automates the calibration process; a calibration profile is generated for each print job based on the current printer, paper, ink, and the room temperature. The printer bot continuously learns, analyzes, and optimizes the process so that existing ICC profiles can be reused and improved upon instead of being generated each time. This, in turn, can improve print quality and reduce the time for color calibration.

FIG. 1 is a simplified block diagram illustrating an environment 100 that includes various entities that cooperate to provide improved color calibration, according to an example embodiment. Example entities of the environment 100 can include a client terminal 104 (with which a user may be associated), a printing system 150 (also referred to herein as a print device), and a cloud server 160. The various entities of the environment 100 can be configured to communicate with one another via a network 111, such as a Local Area Network (LAN), Wide Area Network (WAN), such as the Internet, or another type of wired or wireless network.

The printing system 150 includes a controller 152 and printing equipment 155 (including an embedded spectrophotometer 156 and temperature sensor 157, as illustrated in FIG. 1. Each of these will now be described in further detail, with reference to one or more examples.

The controller 152 can include a processor 152a and a memory 152b. The controller 152 can include other subsystems, such as an input/output (I/O) subsystem, for example. The processor 152a is in communication with the memory 152b. The processor 152a is configured to execute instruction code stored in the memory 152b. The instruction code may include a bot application 158 that facilitates performing, by the controller 152, various functions associated with providing color calibration for print jobs sent via print job requests 132. The processor 152a can correspond to a stand-alone computer system such as an Intel®, AMD®, or ARM® based computer system or a different computer system and can include application-specific computer systems. The computer system can include an operating system, such as Microsoft Windows®, Linux, Unix®, Mac OS®, or a different operating system. In addition, the operations performed by the various subsystems can be combined into a fewer or greater number of subsystems to facilitate speed scaling, cost reductions, etc. Further example implementation details of the controller 152 and other computer systems are described with reference to FIG. 5.

In one example, the controller 152 can be configured to coordinate operations performed by the printing equipment 155. For example, the controller 152 can be configured to receive print job requests 132 (also referred to as "print jobs," "print files," and/or "print job files" herein) from entities (e.g., the client terminal 104) outside of the printing system 150 and to communicate the print job requests 132 to the printing equipment 155. As described in more detail below, the controller 152 can be further configured to assist in providing color calibration for print jobs sent via print job requests 132. The controller 152 may communicate with the spectrophotometer 156, the temperature sensor 157, and/or the cloud server 160 (described in further detail with respect to FIG. 2) to assist in providing such functionality.

While, in the example of FIG. 1 and elsewhere throughout this description, the controller 152 is illustrated and described as implementing at least a portion of the color calibration functionality, some or all of the color calibration functionality may instead be implemented elsewhere in the printing system 150 or in another related, associated, or connected device or system.

In one example, the printing equipment 155 can include a Front-End Processor (FEP) 155a, a Print Engine Processor (PEP) 155b, and one or more printers 155c. The FEP 155a, also referred to as a Digital Front-End (DFE) herein, can be configured to convert bitmap images, vector graphics, fonts, etc., associated with pages specified in the print job request 132 to a bitmap/rasterized representation of the image (e.g., C, M, Y, and K pixels). The manner in which the FEP 155a rasterizes the pages specified in the print job request can depend on various image rasterization parameters of the FEP 155a. For example, these image rasterization parameters may include and/or effect calibration curves, paper definitions, international color consortium profiles (ICC profiles), spot color definitions, tone adjustment curves, color conversion settings, colorant limits (e.g., ink, toner), rendering intent, K preservation, CGR level, etc., max colorant densities, print margin, and/or halftones. Such image rasterization parameters (e.g., color profiles) may be modified based on color calibration performed according to embodiments set forth herein, according to some examples.

In one example, the PEP 155b can be included or in communication with the printer 155c. The printer 155c can correspond to an industrial printer, for example, such as one capable of printing thousands of pages an hour. In this regard, the printer 155c can be ink-based, toner-based, or can use a different medium. The PEP 155b can include various parameters that can control the operation of the printer 155c, based on print instructions included in or with the print job request 132.

The printing equipment also includes the spectrophotometer 156 and the temperature sensor 157, both of which are embedded (physically part of) the printing equipment 155. The spectrophotometer 156 is a built-in instrument that measures an amount of light reflected by a sample. The spectrophotometer 156 works by passing a light beam onto a surface of a sample (e.g., a color-printed page) and passing reflected light through color filters to measure light intensity of the sample. One or more lenses, mirrors, and/or other optics may be included in the light pathway to accommodate the particular physical arrangement of the light source, sample, and filters. The embedded spectrophotometer 156 allows for monitoring color accuracy for color calibration on-the-fly, as described herein. While a simple colorimeter might have only three filters (red, green, and blue), a more sophisticated spectrophotometer might instead have many more filters, such as 31 filters, each measuring light in a different wavelength or wavelength range. The embedded spectrophotometer 156 may be a 0-degree/45-degree spectrophotometer, a spherical spectrophotometer, or a multi-angle spectrophotometer, for example. The temperature sensor 157 may include one or more thermistors, thermocouples, or other temperature sensors and associated circuitry to provide the controller 152 with an indication of sensed ambient temperature at the printing equipment 155. Ambient temperature may be considered as part of color calibration.

Figure 2:
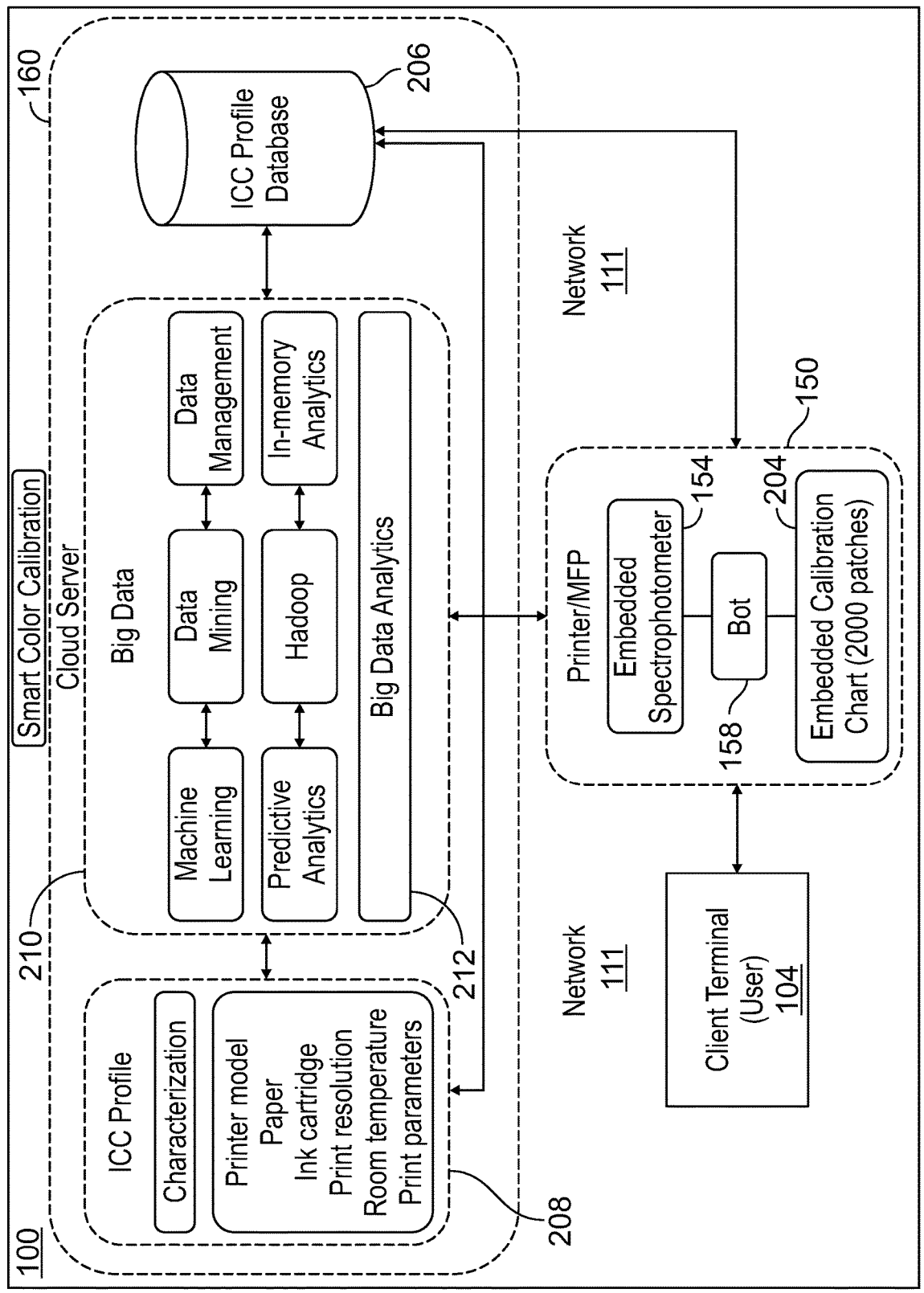
FIG. 2 is a simplified block diagram illustrating the environment of FIG. 1, with additional components cooperating to provide improved color calibration, according to an example embodiment.
Figure 3:
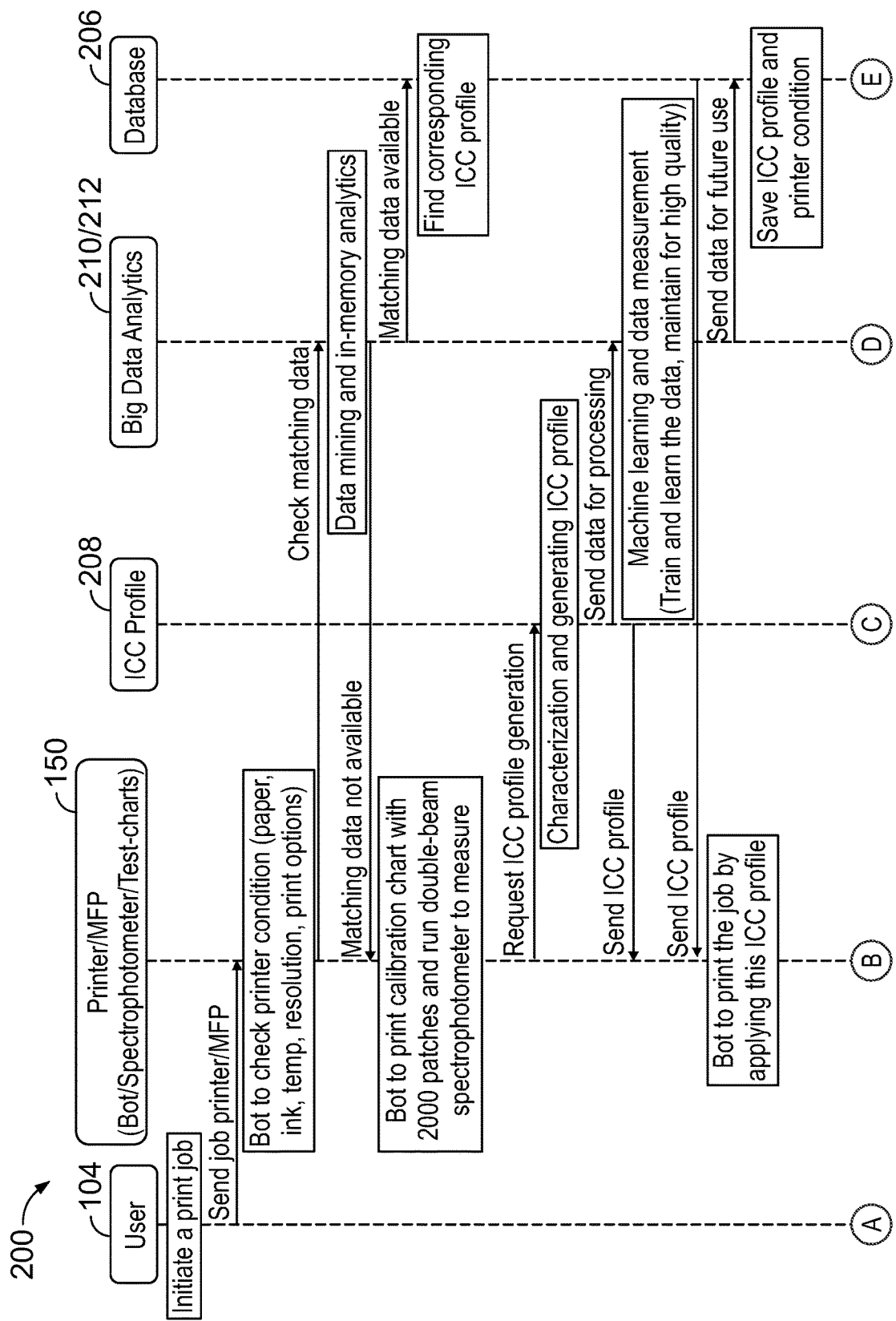
FIG. 3 is a simplified sequence diagram illustrating communications and messaging between various entities that cooperate to facilitate providing improved color calibration, according to an example embodiment.
Figure 3:
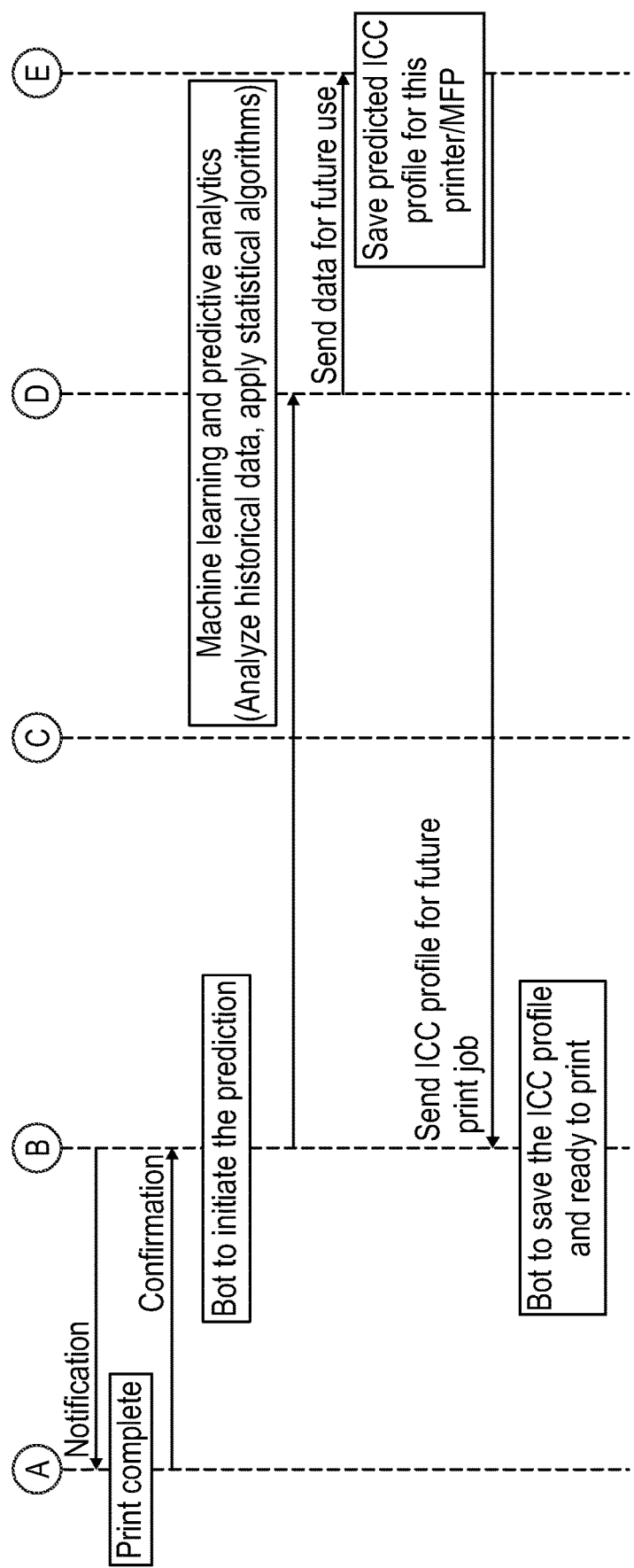

FIG. 2 is a simplified block diagram illustrating the environment 100 of FIG. 1, with additional components cooperating to provide improved color calibration, according to an example embodiment. FIG. 3 is a simplified sequence diagram illustrating communications and messaging between various entities that cooperate to facilitate providing improved color calibration, according to an example embodiment. The following discussion references both FIGS. 2 and 3 in stepping through an example sequence that may be used to provide improved color calibration according to an example embodiment.

The example printing system 150 is illustrated as including the embedded spectrophotometer 154, as described above, and the bot 158, which may be implemented via the processor 152a executing instructions stored in the memory 152b of the controller 152 (see FIG. 1) to act on received inputs and generate corresponding outputs according to one or more logical directives or rules. The printing system 150 also includes an embedded color calibration chart 204, which may be stored in the memory 152b (see FIG. 1), for example. In some examples, the embedded calibration chart includes a plurality of color patches (e.g., 2000 patches, as illustrated) corresponding to known colors (e.g., known Cyan, Magenta, Yellow, and Black (CMYK) colors), having known locations in the independent CI ELAB (L*a*b*) color space defined by the International Commission on Illumination. Other variations of the embedded calibration chart 204 are possible, depending on the number of colorants/inks supported by the printing system 150 and the particular independent color space in use. The embedded calibration chart 204 may be a representation of a plurality of columns and/or rows of adjacent representative color patches spanning across the supported color gamut of the printing system 150. According to some examples, the embedded calibration chart 204 may be printed onto a sheet of paper at the printing system 150 or otherwise physically embodied in the printing system 150, for reference scanning/measuring with the embedded spectrophotometer 157.

The example cloud server 160 includes executable software components and/or stored data including at least an ICC profile database 206, an ICC profile generator 208 (e.g., including a service to generate color characterization from associated print device data such as printer model, paper, ink cartridge, print resolution, ambient (room) temperature, and print parameters), and a big data service 210 (e.g., including one or more machine learning, data mining, data management, predictive analytics, Hadoop or other big data utility/framework, and/or in-memory analytics components). In one example, one or more of the ICC profile database 206, an ICC profile 208, and a big data service 210 are implemented via or in conjunction with one or more processors (not shown in FIG. 1 or 2 but described with reference to FIG. 5) of the cloud server 160 executing instructions stored in a memory (not shown in FIG. 1 or 2 but described with reference to FIG. 5) of the cloud server 160 to act on received inputs and generate corresponding outputs according to one or more logical directives or rules.

According to one example, the client terminal 104 initiates a print job, such as by a user at the client terminal 104 selecting a print function for a particular document, which may include specifying print options such as a particular print device, paper type and size, ink (e.g., color vs. black and white or grayscale), print resolution/quality, and other parameters. The client terminal 104 sends the print job as a print job request to the print device/system 150.

The print system 150, which includes the printer bot 158, the embedded spectrophotometer 154, and embedded color calibration chart 204, uses the printer bot 158 to determine current printer condition data, such as the status of paper (e.g., type of sheets), ink (e.g., volume/density, colors, etc.), temperature (e.g., using the embedded temperature sensor described herein), resolution, and/or print options. The print system 150 connects to the big data service 210 at the cloud server 160 to check for data that matches (e.g., exactly or within a defined threshold) the current print device data determined by the printer bot 158.

The big data service 210 (e.g., using the big data analytics 212) performs data mining and/or in-memory analytics to determine whether the current print device data from the printer bot matches (e.g., exactly or within a defined threshold) or is predicted to match (associated with a matching predicted ICC profile) corresponding data accessible by the big data service 210, such as in the ICC profile database 206.

If matching data or predicted matching data is found, then the big data service 210 retrieves the corresponding ICC profile from the ICC profile database 206 and communicates it to the print system 150 for printing the print job from the print job request received from the client terminal 104.

If matching data is not found (and no predicted matching data exists), then the big data service 210 notifies the print system 150 (e.g., the printer bot 158) of the lack of a match. The printer bot 158 uses the embedded color calibration chart 204 to cause the print system 150 to print (e.g., on a sheet of paper) the embedded color calibration chart 204. The printer bot 158 then causes the embedded spectrophotometer 154 (e.g., a double-beam spectrophotometer) to measure color readings from each of the patches (e.g., 2000 CMYK patches) printed on the printed embedded color calibration chart.

The print system 150 (e.g., the printer bot 158) sends the measured color readings to the ICC profile generator 208 and requests generation of a corresponding ICC profile. The ICC profile generator 208 performs color characterization according to the received measured color readings and associated data (e.g., print system 150, including ambient temperature sensed by the embedded temperature sensor 157) and generates a new ICC profile for the current print job. The ICC profile generator 208 sends the new ICC profile and associated data to the big data service 210 to allow for training and learning from the data (e.g., by the machine learning component) and/or data maintenance/cleaning (e.g., by the data management component), after which the big data service 210 could send the new ICC profile (or a modified version thereof) to the print system 150. The ICC profile generator 208 additionally or alternatively sends the ICC profile to the print system 150 (e.g., the printer bot 158).

The print system then prints the print job from the print job request received from the client terminal 104 by applying the newly received ICC profile (customized/calibrated for the specific print job). The client terminal is then notified that printing of the print job (using the new ICC profile) is complete, which is acknowledged/confirmed by the client terminal 104.

The printer bot 158 in the print system 150 can then initiate a predicted ICC profile sequence for use with future print jobs. This may include the printer bot 158 instructing the big data service 210 to analyze historical data (e.g., data provided by the printer bot 158 on behalf of the print device 150) and apply statistical algorithms, such as via the machine learning and/or predictive analytics components of the big data service 210. Alternatively, the big data service 210 may autonomously analyze historical data and apply statistical algorithms to data received from the print system 150 and/or other such print systems. The machine learning component may, for example, include or reference one or more machine learning models (e.g., supervised and/or unsupervised) to identify trends or patterns in the collected data (e.g., stored in a data lake). Additionally, predictive analytics functionality (e.g., implemented using machine learning and predictive models, descriptive models, and/or decision models) in the big data service 210 may assist in predicting relevance (i.e., matching within acceptable tolerances) of generated ICC profiles for determined print job data. The big data service 210 can then provide generated data and/or corresponding ICC profiles to the ICC profile database 206 as a predicted ICC profile for the print system 150, for use with future print jobs by the printer bot 158 in the print system 150.

Figure 4:
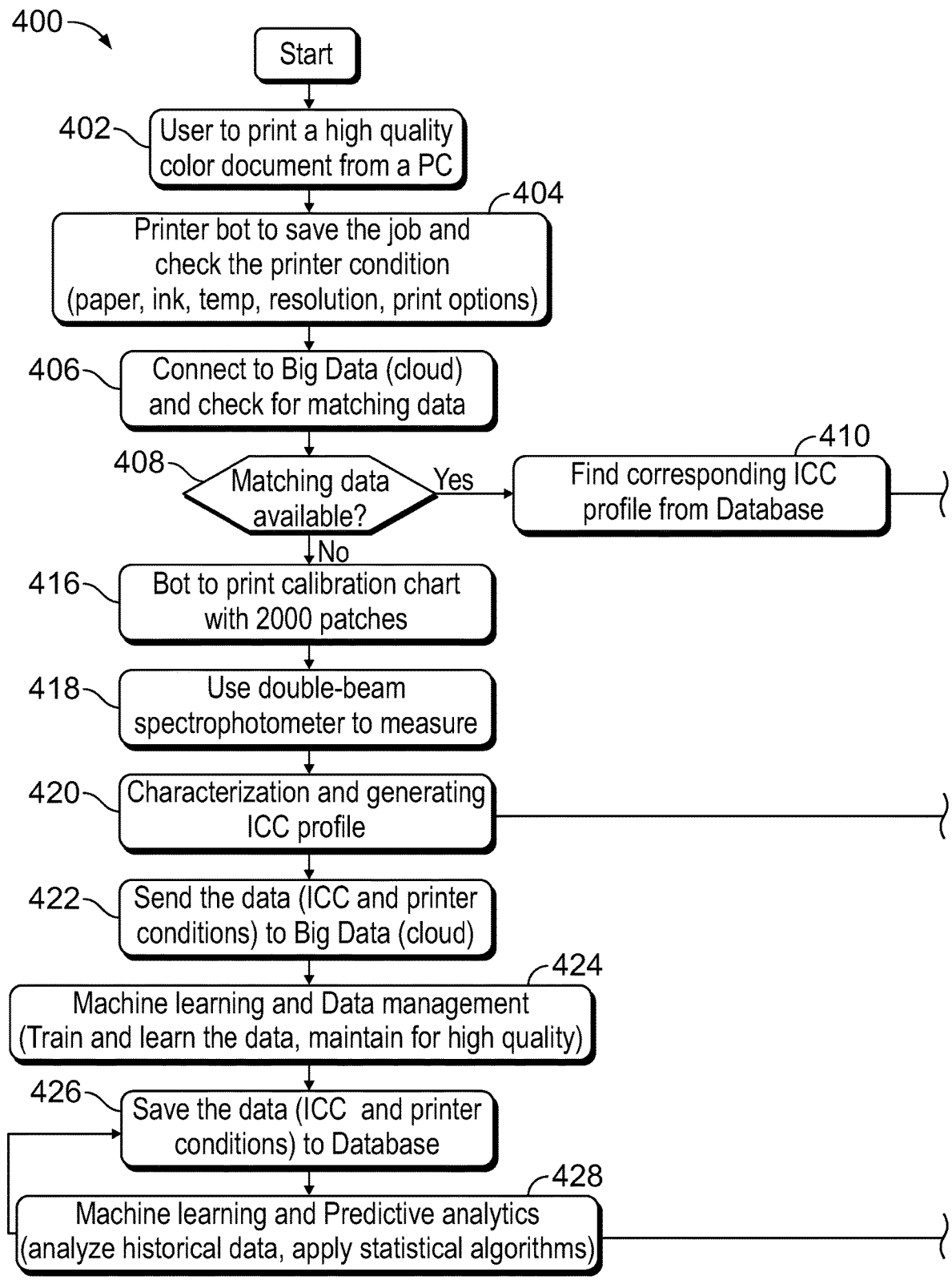
FIG. 4 is a flow diagram illustrating a method for providing improved color calibration, according to an example embodiment.
Figure 4:
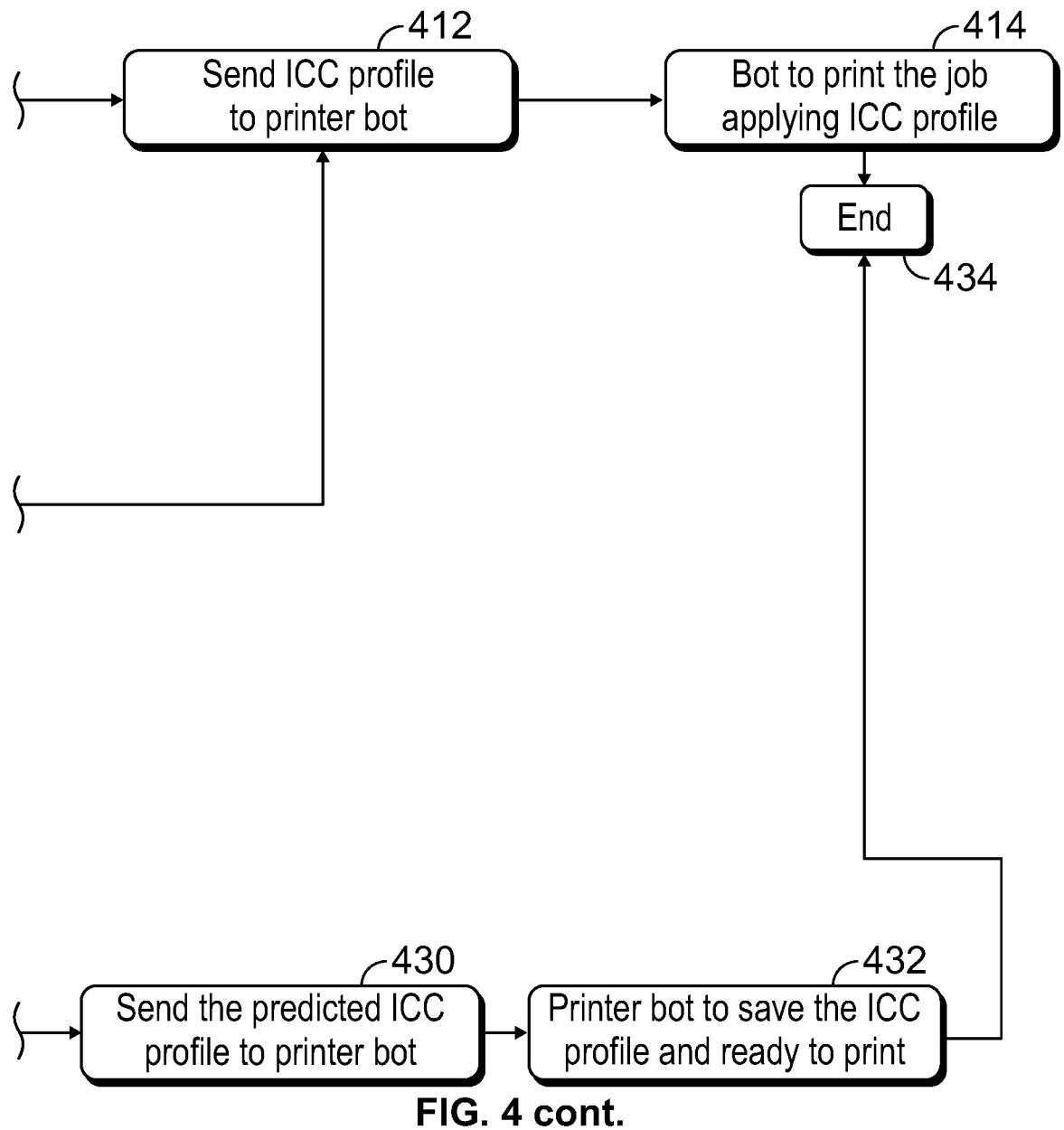

FIG. 4 is a flow diagram illustrating a method 400 for providing color calibration to a printing system, according to an example embodiment. In particular, method 400 may represent a specific sequence or series of actions that, when performed, allows for the provision of color calibration for production printing, for example. The method 400 and variations (see the examples set forth in the following description) could be a series or plurality of functions performed by a processor executing instructions stored on a non-transitory computer-readable medium, as described with respect to FIG. 5, for example. In another example, the method 400 could be performed, at least in part, at a printing device having a print controller with at least one processor and a non-transitory computer-readable medium having instructions stored therein to cause the at least one processor to perform functions associated with the method 400, including variations thereof.

In block 402, the method 400 involves a printing device receiving, from a client device (e.g., from a user at the client device), a print job request for a high-quality color document. For example, the client device may have selected a high-quality print setting or configuration in an application or driver at the client device. In block 404, the method 400 involves a printer bot at the print device saving the print job from the print job request and performing a system check of the print device to determine current print device data. This may include, for example, the bot executing instructions to determine the status of paper (e.g., type of sheets), ink (e.g., volume/density, colors, etc.), temperature (e.g., using the embedded temperature sensor described herein), resolution, and/or print options. In block 406, the method 400 involves the print device connecting to the cloud server to access the big data service to check for data that matches (e.g., exactly or within a defined threshold) the current print device data determined by the printer bot. In block 408, the method 400 involves determining whether the current print device data determined by the printer bot matches (e.g., exactly or within a defined threshold) corresponding data at the big data service.

If it is determined in block 408 that the current print device data determined by the printer bot does match (e.g., exactly or within a defined threshold) corresponding data at the big data service, then a corresponding ICC profile is identified in the ICC profile database, as shown in block 410. In block 412, the identified corresponding ICC profile from the ICC profile database is communicated from the cloud server to the printer bot at the print device. In block 414, the print bot applies the communicated identified corresponding ICC profile to the saved print job from the print job request and the print device prints the saved print job using that ICC profile. The print device then awaits a next print job request.

If it is determined in block 408 that the current print device data determined by the printer bot does not match (e.g., exactly or within a defined threshold) corresponding data at the big data service, then the printer bot causes the print device to print a color calibration chart (e.g., on a paper sheet) using the embedded color calibration chart (see FIG. 2), as shown in block 416. In block 418, the print device (e.g., the printer bot or the controller executing other instructions) then uses the embedded spectrophotometer (e.g., a double-beam spectrophotometer) to make color measurements on the printed color calibration chart. In block 420, using the color measurements from the embedded spectrophotometer, the print device's color performance is characterized (e.g., by an ICC profile generation service accessed by the printer bot). This may include, for example, the ICC profile generation service creating a new ICC profile (specific to the saved print job), which can be used to print the saved print job (blocks 412 and 414) with color calibrated to the appropriate paper/ink/resolution/etc.

In block 422, following the characterization and ICC profile generation of block 420, the print device (e.g., the printer bot) may then send the new ICC profile and current print device data (or they may be otherwise communicated from the ICC profile generation service) to the big data service at the cloud server. In block 424, the big data service can process the data, if needed, such as by utilizing machine learning and/or data management/analysis techniques to train from and learn the received data and maintain a quality level of the data (e.g., conform to defined data storage specifications). In block 426, the data (perhaps cleaned, modified, or otherwise acted on by the big data service) is saved in the ICC profile database at the cloud server. Saving the new ICC profile and current print device data (or representations of such data) to the ICC profile database allows for the big data service, particularly machine learning and predictive analytics components, to analyze historical data and apply statistical algorithms, as shown in block 428. This may be helpful to "fill in gaps" in data, to determine predicted ICC profile matches, set acceptable thresholds for data matches, and other purposes, for example. In block 430, a predicted ICC profile is communicated from the cloud server to the printer bot of the printer device, as an example. In block 432, the print bot saves the communicated predicted ICC profile at the printer device for use in printing a print job using the ICC profile. Such a predicted ICC profile (and its associated data) could serve as the corresponding ICC profile and associated matching data referred to above in blocks 408-414, for example.

Figure 5:
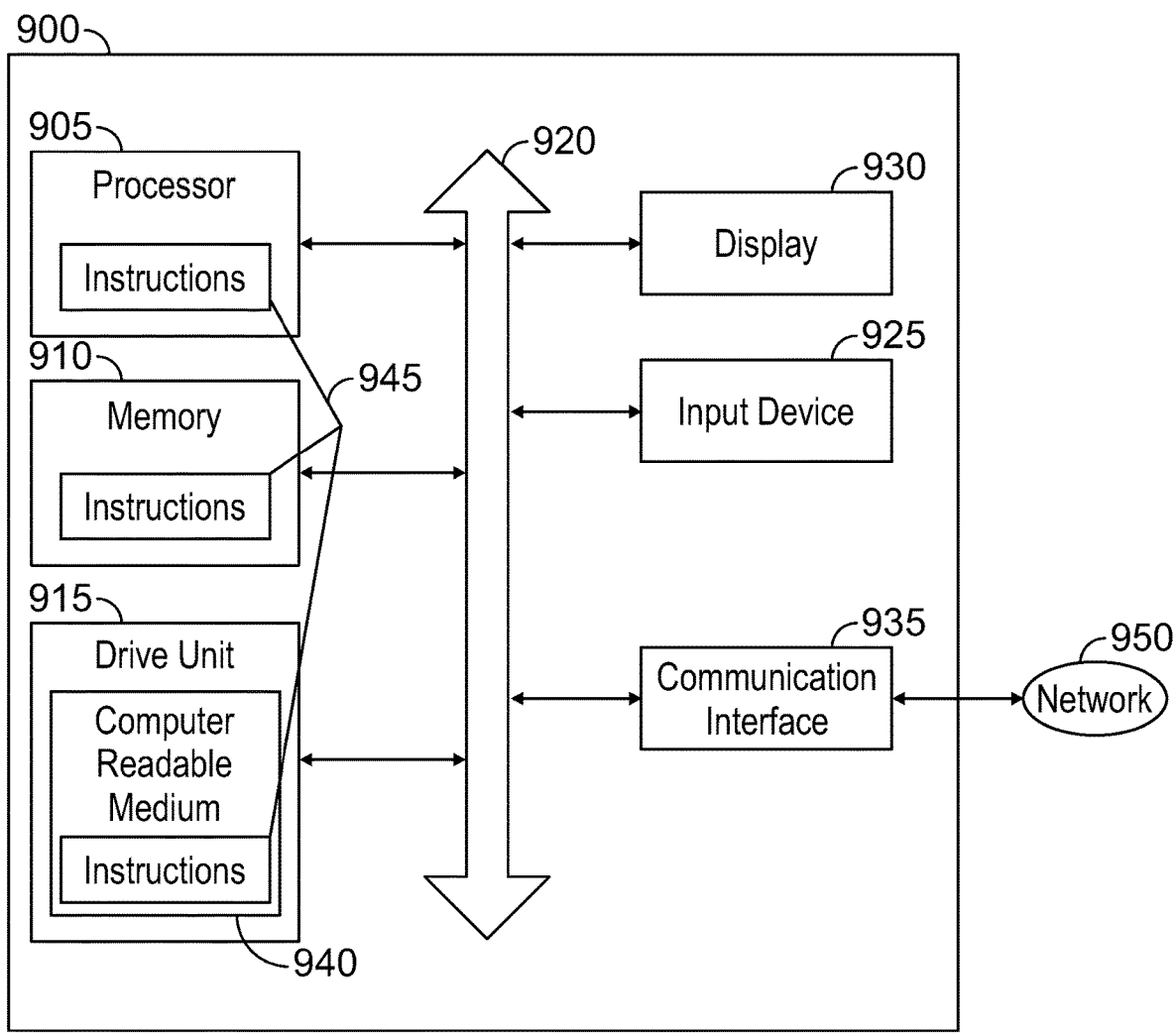
FIG. 5 is a simplified block diagram illustrating an example computer system that may be utilized in one or more example embodiments.

FIG. 5 is a simplified block diagram illustrating an example computer system 900 that may be utilized in one or more example embodiments. The computer system 900 can form part of or implement any of the systems and/or devices described above. The computer system 900 can include a set of instructions 945 that the processor 905 can execute to cause the computer system 900 to perform any of the operations described above. The computer system 900 can operate as a stand-alone device or can be connected, e.g., using a network, to other computer systems or peripheral devices, for example.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, a hard disk drive, or any other type of memory or storage device.

The computer system 900 can include a display 930, such as a light-emitting diode (LED) display, liquid crystal display (LCD), a cathode ray tube (CRT), or any other display suitable for conveying information. The display 930 can act as an interface for the user to see processing results produced by processor 905.

Additionally, the computer system 900 can include an input device 925, such as a keyboard or mouse or touchscreen, configured to allow a user to interact with components of system 900.

The computer system 900 can also include a disk or an optical or solid-state drive unit 915. The drive unit 915 can include a computer-readable medium 940 in which the instructions 945 can be stored. The instructions 945 can reside completely, or at least partially, within the memory 910 and/or within the processor 905 during execution by the computer system 900. The memory 910 and the processor 905 also can include computer-readable media as discussed above.

The computer system 900 can include a communication interface 935 to support communications via a network 950. The network 950 can include wired networks, wireless networks, or combinations thereof. The communication interface 935 can enable communications via any number of communication standards, such as 802.11, 802.12, 802.20, VViMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. "Computer program" as used herein refers to an expression, in a machine-executable language, code or notation, of a set of machine-executable instructions intended to cause a device to perform a particular function, either directly or after one or more of (a) conversion of a first language, code, or notation to another language, code, or notation; and (b) reproduction of a first language, code, or notation. Such a computer program may be stored as instructions in a non-transitory computer-readable medium, for example.

The above detailed description sets forth various features and operations of the disclosed systems, apparatus, devices, and/or methods with reference to the accompanying figures. The example embodiments described herein and in the figures are not meant to be limiting, with the true scope being indicated by the following claims. Many modifications and variations can be made without departing from its scope, as will be apparent to those skilled in the art. Functionally equivalent systems, apparatus, devices, and/or methods within the scope of the disclosure, in addition to those described herein, will be apparent to those skilled in the art from the foregoing descriptions. It will be readily understood that the aspects of the present disclosure, as generally described herein, and illustrated in the figures, can be arranged, substituted, combined, separated, and designed in a wide variety of different configurations. Such modifications and variations are intended to fall within the scope of the appended claims. Finally, all publications, patents, and patent applications cited herein are hereby incorporated by reference for all purposes.

The invention claimed is:

1. A method for color calibration of a print device, the method comprising:
receiving, at the print device, a print job request that includes a color print job;
determining, at the print device, print job data including data associated with the color print job and the print device, wherein the data associated with the print device includes an ambient temperature sensed by an embedded temperature sensor in the print device;
transmitting, by the print device, the print job data to a cloud server to request a stored matching color profile having associated data that matches, within a defined threshold, the print job data;
receiving, at the print device, a communication from the cloud server indicating that no stored matching profile exists at the closed server;
printing, by the print device, a physical representation of an embedded color calibration chart, wherein the embedded color calibration chart is stored, in advance, on the print device and comprises a plurality of different color patches each having a known color value in an independent color space;
measuring, by an embedded spectrophotometer in the print device, color information to determine offsets between color values of patches in the physical representation of the embedded color calibration chart and the known color values of patches in the stored color calibration chart;
generating a color profile from the determined offsets; and
printing, at the print device, the color print job by applying the generated color profile to the color print job.

2. The method of claim 1, further comprising transmitting, by the print device, the generated color profile to the cloud server.

3. The method of claim 2, wherein the generated color profile transmitted to the cloud server is stored and analyzed at the cloud server.

4. The method of claim 3, further comprising:
receiving, at the print device and from the cloud server, in response to the request for the stored matching color profile, a predicted matching color profile corresponding to a previously stored and analyzed generated color profile; and
printing, at the print device, the color print job by applying the predicted matching color profile to the color print job.

5. The method of claim 4, wherein the predicted matching color profile is associated with print job data determined by a data service in the cloud server to be within a defined tolerance of the print job data that includes the data associated with the color print job and the print device, including the ambient temperature sensed by an embedded temperature sensor in the print device.

6. A non-transitory computer-readable medium having instructions stored therein to cause at least one processor to perform functions for color calibration of a print device, the functions comprising:
receiving, at the print device, a print job request that includes a color print job;
determining, at the print device, print job data including data associated with the color print job and the print device, wherein the data associated with the print device includes an ambient temperature sensed by an embedded temperature sensor in the print device;
transmitting, by the print device, the print job data to a cloud server to request a stored matching color profile having associated data that matches, within a defined threshold, the print job data;
receiving, at the print device, a communication from the cloud server indicating that no stored matching profile exists at the closed server,
printing, by the print device, a physical representation of an embedded color calibration chart, wherein the embedded color calibration chart is stored, in advance, on the print device and comprises a plurality of different color patches each having a known color value in an independent color space,
measuring, by an embedded spectrophotometer in the print device, color information to determine offsets between color values of patches in the physical representation of the embedded color calibration chart and the known color values of patches in the stored color calibration chart,
generating a color profile from the determined offsets; and
printing, at the print device, the color print job by applying the generated color profile to the color print job.

7. The non-transitory computer-readable medium of claim 6, further comprising transmitting, by the print device, the generated color profile to the cloud server.

8. The non-transitory computer-readable medium of claim 7, wherein the generated color profile transmitted to the cloud server is stored and analyzed at the cloud server.

9. The non-transitory computer-readable medium of claim 8, further comprising:
receiving, at the print device and from the cloud server, in response to the request for the stored matching color profile, a predicted matching color profile corresponding to a previously stored and analyzed generated color profile; and
printing, at the print device, the color print job by applying the predicted matching color profile to the color print job.

10. The non-transitory computer-readable medium of claim 9, wherein the predicted matching color profile is associated with print job data determined by a data service in the cloud server to be within a defined tolerance of the print job data that includes the data associated with the color print job and the print device, including the ambient temperature sensed by an embedded temperature sensor in the print device.

11. A print device having color calibration, comprising:
an embedded spectrophotometer for measuring color performance of the print device;
an embedded temperature sensor for measuring an ambient temperature at the print device; and
a controller having a processor to execute instructions stored in a memory, the memory additionally storing a color calibration chart having a plurality of different color patches each having a known color value in an independent color space, the instructions executable by the processor to implement a print bot that performs functions including:
determining, at the print device, print job data including data associated with the print device and with a color print job received in a print job request, wherein the data associated with the print device includes an ambient temperature sensed by the embedded temperature sensor in the print device; and
transmitting, by the print device, the print job data to a cloud server to request a stored matching color profile having associated data that matches, within a defined threshold, the print job data.

12. The print device of claim 11, wherein the functions further comprise:
receiving, at the print device, the matching color profile from the cloud server; and
printing, at the print device, the color print job by applying the matching color profile to the color print job.

13. The print device of claim 11, wherein the functions further comprise:
receiving, at the print device, a communication from the cloud server indicating that no stored matching profile exists at the cloud server;
printing, by the print device, a physical representation of the embedded color calibration chart;
measuring, by the embedded spectrophotometer in the print device, color information to determine offsets between color values of patches in the physical representation of the embedded color calibration chart and the known color values of patches in the stored color calibration chart;
generating a color profile from the determined offsets; and
printing, at the print device, the color print job by applying the generated color profile to the color print job.

14. The print device of claim 13, wherein the functions further comprise transmitting, by the print device, the generated color profile to the cloud server for storage and analysis at the cloud server.

15. The print device of claim 14, wherein the functions further comprise:
receiving, at the print device and from the cloud server, in response to the request for the stored matching color profile, a predicted matching color profile corresponding to a previously stored and analyzed generated color profile; and
printing, at the print device, the color print job by applying the predicted matching color profile to the color print job.

16. The print device of claim 15, wherein the predicted matching color profile is associated with print job data determined by a big data service in the cloud server to be within a defined tolerance of the print job data that includes the data associated with the color print job and the print device, including the ambient temperature sensed by an embedded temperature sensor in the print device.

* * * * *